United States Patent [19]
Mills

[11] Patent Number: 6,006,420
[45] Date of Patent: Dec. 28, 1999

[54] TELEPHONE CABLE SPLICING TOOL

[76] Inventor: Kenneth E. Mills, 6620 Crestland, Dallas, Tex. 75252

[21] Appl. No.: 08/850,861

[22] Filed: May 2, 1997

[51] Int. Cl.[6] .................................................. H01R 43/20
[52] U.S. Cl. .............................. 29/721; 29/750; 269/45; 269/903
[58] Field of Search ............................ 29/721, 334, 750, 29/751; 269/45, 97, 64, 218, 228, 903

[56] References Cited

U.S. PATENT DOCUMENTS

| 62,062 | 2/1867 | Peace . | |
|---|---|---|---|
| D. 175,291 | 8/1955 | Ammon et al. . | |
| 439,918 | 11/1890 | Wilkes . | |
| 1,064,399 | 6/1913 | Thompson et al. . | |
| 1,402,391 | 1/1922 | Baldus . | |
| 2,364,477 | 12/1944 | Sayles et al. . | |
| 3,066,930 | 12/1962 | Chinnick . | |
| 3,907,269 | 9/1975 | Baker, Jr. | 269/55 |
| 4,070,011 | 1/1978 | Glesser . | |
| 4,943,039 | 7/1990 | Jackson | 269/45 |
| 5,058,869 | 10/1991 | Ruthven | 269/45 |

OTHER PUBLICATIONS

Photographs A–U, Type 945A Telephone Cable Splicing Tool.

*Primary Examiner*—Lee Young
*Assistant Examiner*—Rick Kiltae Chang
*Attorney, Agent, or Firm*—Daniel V. Thompson

[57] ABSTRACT

A telephone cable splicing tool including a splicing tray, a rod having two ends, with one end engaged with the splicing tray, and vise grip pliers engaged with the other end of the rod.

3 Claims, 3 Drawing Sheets

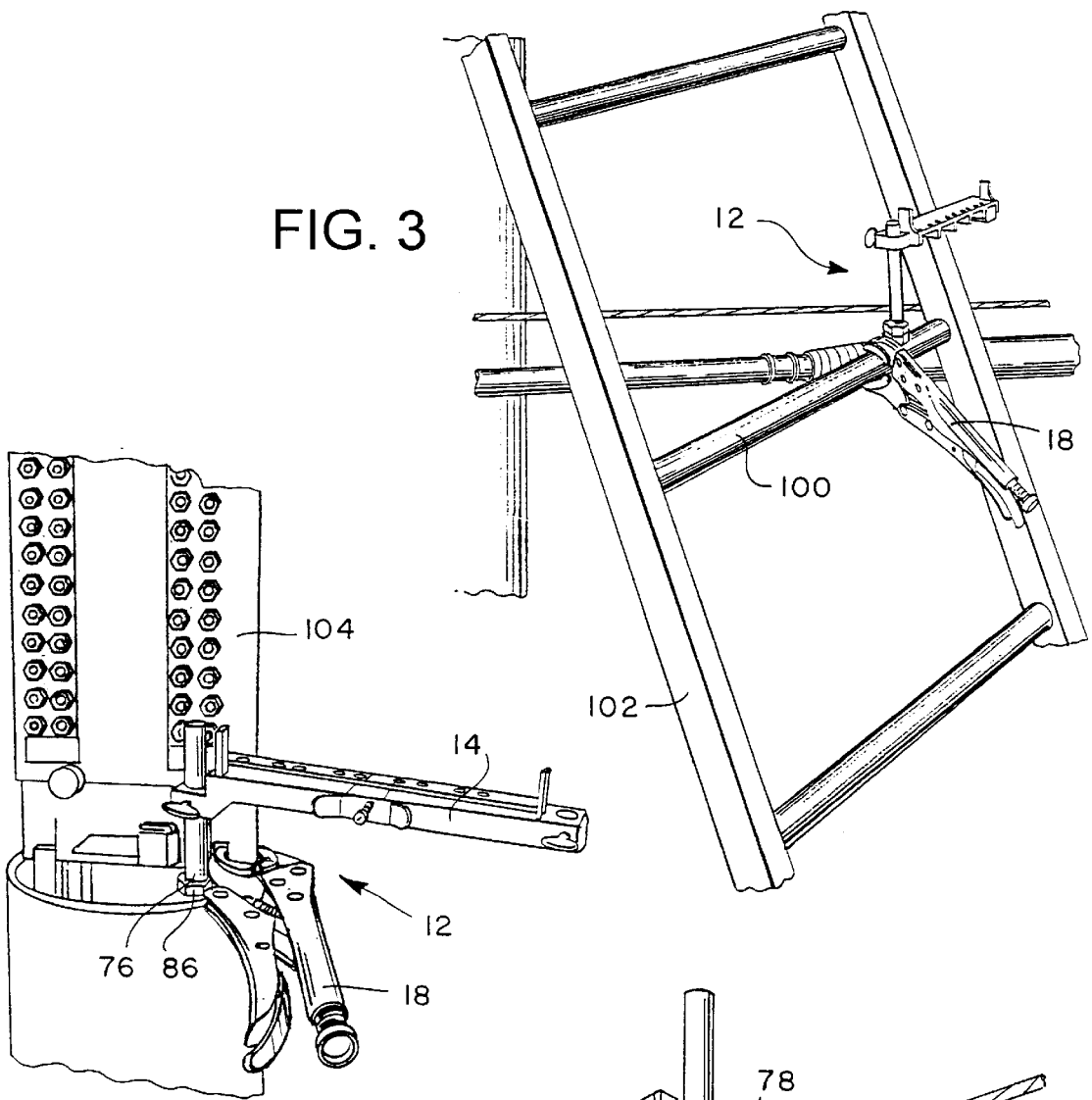
FIG. 3
FIG. 4
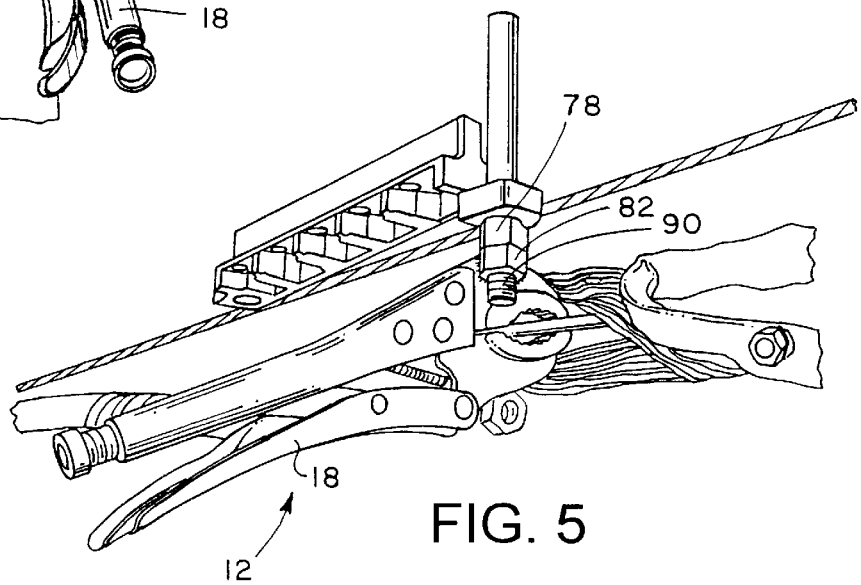
FIG. 5

TELEPHONE CABLE SPLICING TOOL

TECHNICAL FIELD

The present invention relates to cable splicing tools, and more particularly to a cable splicing tool having a temporary gripping attachment.

BACKGROUND ART

The state of the art in splicing tools used by telephone cable splicing technicians is splicing tray having a cylindrical bore at one end and a thumb screw threaded transversely to the bore. A smooth cylindrical rod engages the bore in the tray and extends to a clamping device. The clamping device has a thumb screw to lock the cylindrical rod. The clamping device also has a simple clamping mechanism specifically adapted to hang the splicing tool from a horizontal support cable near the work site. The support cable, typically ¼"–⅜" galvanized wire rope, that the clamping device hangs from is obviously not the telephone cable that is going to be spliced. Rather, a pre-existing support cable must be located vertically above the work site in order to use the splicing tool.

A significant drawback of the splicing tool is that the clamping device is not readily adapted to be used in conditions where there is no pre-existing support cable. Many splicing jobs require splicing on ladders or at ground level sites where numerous support surfaces are available, but there is nothing to clamp clamping device to. Thus, there presently exists the need for a clamping apparatus which permits the slicing tool to be used in a variety of different work site situations.

SUMMARY OF THE INVENTION

The present invention provides a telephone cable splicing tool where a splicing tray and rod are engaged with a pair of locking pliers for use in virtually any work site situation.

BRIEF DESCRIPTION OF THE DRAWINGS

A more complete understanding of the invention and its advantages will be apparent from the Detailed Description taken in conjunction with the accompanying Drawings, in which:

FIGS. 3, 4 and 5 are alternate illustrations of alternate additional uses of the invention;

DETAILED DESCRIPTION OF THE PREFERRED EMBODIMENT

Figure 1:
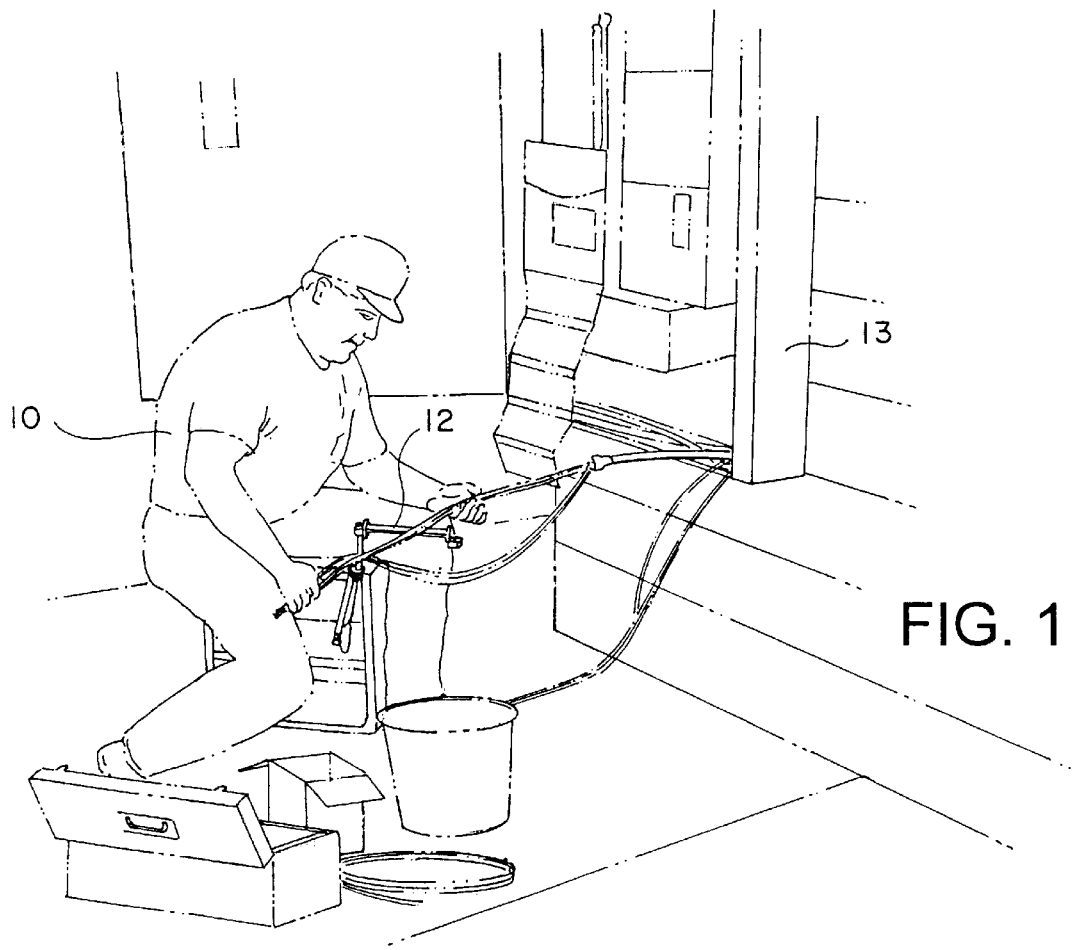
FIG. 1 illustrates a typical use of the invention.
Figure 2:
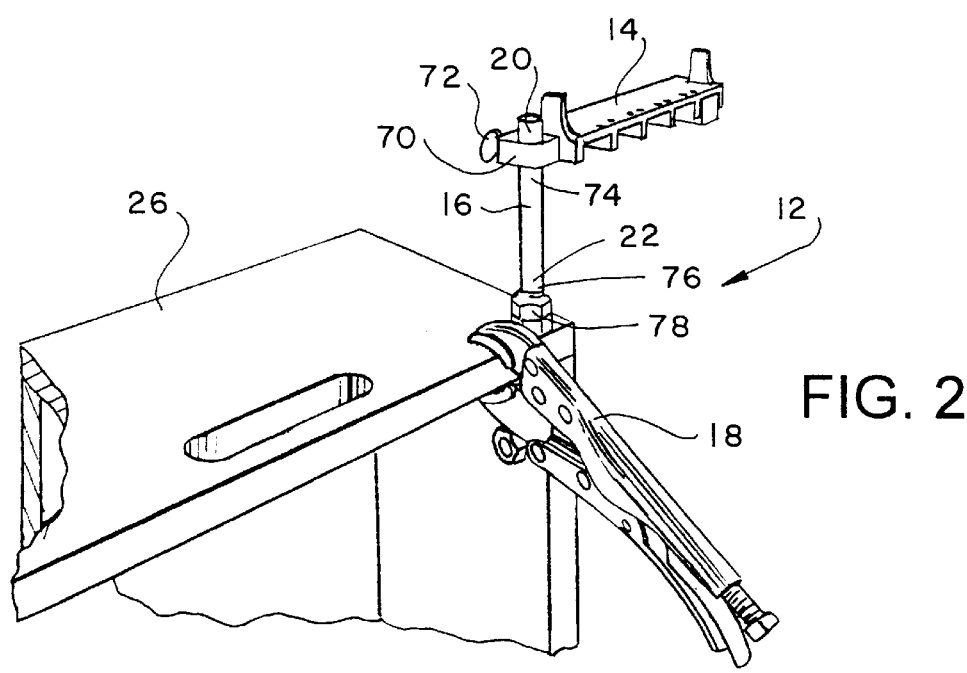
FIG. 2 is a close-up view of the invention in the illustration of FIG. 1.

Referring initially to FIGS. 1 and 2, a telephone cable splicing technician 10 is shown using the telephone cable splicing tool 12 of the present invention adjacent a cable junction box 13 attached to a building. Cable splicing tool 12 includes a splicing tray 14, a rod 16 having two ends, and locking pliers 18. One end 20 of rod 16 is engaged with the splicing tray 14. The other end 22 of rod 16 is engaged with locking pliers 18. As can be seen, tool 12 permits the secure, temporary attachment of splicing tray 14 at the preferred angle and height with respect to box 26, which technician 10 is using as a seat. This arrangement would be impossible with the conventional splicing tray tool currently in use.

Figure 6:
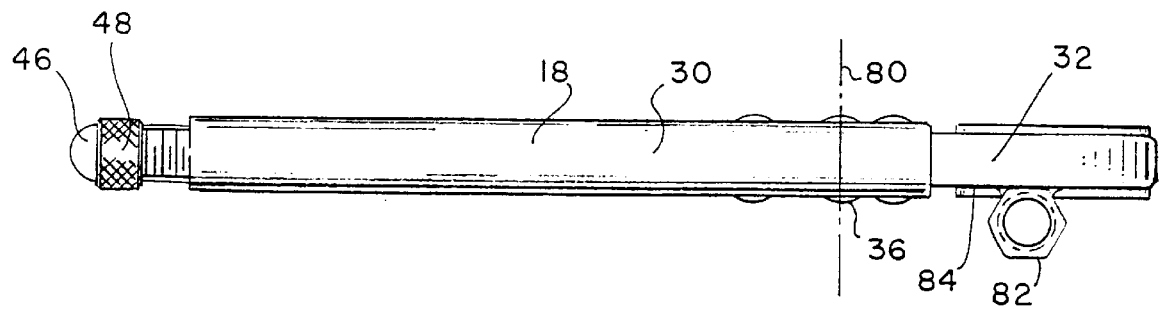
FIG. 6 is an overhead view of the specially adapted locking pliers of the invention.
Figure 7:
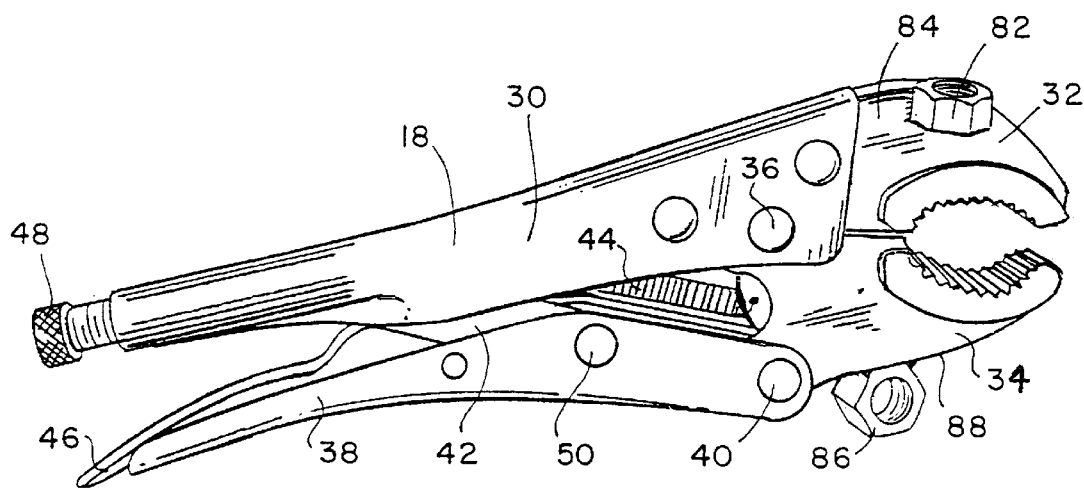
FIG. 7 is a side view of the pliers of FIG. 6.

In greater detail, and in conjunction with FIGS. 6 and 7 in addition to FIGS. 1 and 2, locking pliers 18 is a commercially available and well-known gripping tool or locking wrench. Pliers 18 includes an elongated main handle 30 having a fixed jaw 32 rigidly secured thereto. A movable jaw 34 is pivotally secured to the main handle 30 by means of a pivot pin or rivet 36. A locking handle 38 is pivotally connected at one end to the movable jaw 34 by means of a pivot pin 40, a lever 42, a spring 44, a release lever 46, and an adjustment screw 48. The adjustment screw 48 extends longitudinally with the main handle 30 and is screw threaded therein, so as to be axially moveable relative to the handle 30. The adjustment screw 48 has an inner end (not shown) which has abutting engagement with the outer end of the lever 42, with the inner end of the lever 42 being pivotally secured to the locking handle 38 by a pin or rivet 50 intermediate the opposite ends of the locking handle 38. The spring 44 is of the coil tension type, and has one end secured to the movable jaw 34 and its other end to the lever 42, the spring 44 yieldingly urging the movable jaw 34 in a direction of its pivotal movement away from the fixed jaw 32. The release lever 46 is pivotally mounted intermediate its ends to the locking handle 38, with one end of the release lever 46 engaging the lever 42 to aid in unlocking the locking the handle 38 and moving the movable jaw 34 in a jaw open direction away from the fixed jaw 32. Locking wrenches of this type are well known for their ability to firmly grip and hold a workpiece between the jaws 32 and 34.

Splicing tool 12 further includes a splicing tray 14 having a cylindrical bore 70 at one end and a thumb screw 72 threaded transversely to bore 70. Smooth cylindrical rod 16 has a smooth end 74 and a threaded end 76 with the smooth end 74 engaged with the bore 70 and thumb screw 72 of the splicing tray 14 for adjustable translational and rotational fixing of the rod 16 with respect to the splicing tray 14. A first hex nut 78 is permanently threaded to an inner portion of the threaded end 76 of the rod. Locking pliers 18 have the upper fixed jaw 32 and lower movable jaw 34 hingedly connected for a pivotal movements about a pivot axis 80 (FIG. 6). A second hex nut 82 is permanently welded to a side surface 84 of the upper jaw 32 with the threaded bore of second hex nut 82 being perpendicular to the pivot axis 80. A third hex nut 86 is permanently welded to a bottom edge 88 of the lower jaw 34 with its threaded bore parallel to the pivot axis 80. Second and third hex nuts 82, 86 are sized for selective engagement with an outer portion 90 (FIG. 5) of the threaded end 76 of the rod 16. First hex nut 78 is selectively jam-tightened to the second or third hex nuts 82, 86 as the situation requires.

In operation, as further shown in FIGS. 3–5, the splicing tool 12 of the present invention is usable in many different situations, completely unlike any previously available slicing tool. In FIG. 3, the tool is used on a ladder, with the jaws of pliers 18 connected to rung 100 of ladder 102. In FIG. 4, the cable splicing tool is shown gripping a panel board 104 with threaded end 76 of rod 16 being engaged with third hex nut 86. As can be seen, having the second and third hex nuts selectively available permits the splicing tray 14 to be arrayed in the required horizontal position, while either horizontal or vertical support surfaces can be engaged by locking pliers 18. Finally, FIG. 5 illustrates the tool 12 of the present invention used in an overhead cable splicing situation.

Whereas, the present invention has been described with respect to a specific embodiment thereof, it will be understood that various changes and modifications will be suggested to one skilled in the art, and it is intended to encompass such changes and modifications as fall within the scope of the appended claims.

I claim:

1. A telephone cable splicing tool, comprising:

a splicing tray;

a rod having two ends, with one end engaged with the splicing tray;

locking pliers engaged with the other end of the rod;

the splicing tray having a cylindrical bore at one end and a thumbscrew threaded transversely to the bore;

the rod being a smooth cylindrical rod having a smooth end and a threaded end, with the smooth end engaged with the bore and thumbscrew of the splicing tray for adjustable translational and rotational fixing of the rod with respect to the splicing tray;

a first hex nut permanently threaded to an inner portion of the threaded end of the rod; and with the locking pliers having an upper fixed jaw and a lower movable jaw hingedly connected for pivotal movements about a pivot axis, with a second hex nut permanently welded to a side surface of the upper jaw.

2. The telephone cable splicing tool of claim 1 with the second hex nut having a threaded bore perpendicular to the pivot axis.

3. The telephone cable splicing tool of claim 2 with a third hex nut permanently welded to a bottom edge of the lower jaw with a threaded bore, parallel to the pivot axis, the second and third hex nuts bore sized for selective engagement with a threaded outer portion of the threaded end of the rod, and with the first hex nut being selectively jam-tightened to the second or third hex nuts.

\* \* \* \* \*